United States Patent
Klesyk

(10) Patent No.: US 9,233,611 B2
(45) Date of Patent: Jan. 12, 2016

(54) PROXIMITY DETECTION CIRCUIT HAVING SHORT PROTECTION

(75) Inventor: Krzysztof Klesyk, Novi, MI (US)

(73) Assignee: Lear Corporation, Southfield, MI (US)

( * ) Notice: Subject to any disclaimer, the term of this patent is extended or adjusted under 35 U.S.C. 154(b) by 824 days.

(21) Appl. No.: 13/293,343

(22) Filed: Nov. 10, 2011

(65) Prior Publication Data

US 2013/0120889 A1     May 16, 2013

(51) Int. Cl.
*H02H 3/00* (2006.01)
*B60L 3/00* (2006.01)
*B60L 11/18* (2006.01)

(52) U.S. Cl.
CPC ........... *B60L 3/0069* (2013.01); *B60L 11/1818* (2013.01); *Y02T 10/705* (2013.01); *Y02T 10/7005* (2013.01); *Y02T 10/7066* (2013.01); *Y02T 90/14* (2013.01)

(58) Field of Classification Search
CPC ... B60L 3/006; B60L 3/0069; B60L 11/1818; Y02T 10/7005; Y02T 90/14; Y02T 10/705; Y02T 10/7066
USPC .......................................................... 361/87
See application file for complete search history.

(56) References Cited

U.S. PATENT DOCUMENTS

| | | | |
|---|---|---|---|
| 4,439,819 A | 3/1984 | Regan | |
| 4,897,662 A * | 1/1990 | Lee | .......................... H01Q 1/24 327/205 |
| 5,012,113 A | 4/1991 | Valentine et al. | |
| 5,151,645 A | 9/1992 | Murata | |
| 5,617,466 A | 4/1997 | Walance | |
| 5,978,236 A | 11/1999 | Faberman et al. | |
| 6,393,571 B1 | 5/2002 | Huckfeldt et al. | |
| 6,459,247 B1 | 10/2002 | Benes | |
| 6,662,123 B2 | 12/2003 | Maeckel et al. | |
| 6,724,593 B1 * | 4/2004 | Smith | .................... H02J 7/0034 361/84 |
| 6,905,362 B2 | 6/2005 | Williams | |
| 6,963,186 B2 | 11/2005 | Hobbs | |
| 7,253,584 B2 | 8/2007 | Souther et al. | |
| 7,279,805 B2 | 10/2007 | Senda et al. | |
| 7,411,371 B2 | 8/2008 | Hobbs | |
| 7,506,182 B2 | 3/2009 | Taniguchi et al. | |

(Continued)

FOREIGN PATENT DOCUMENTS

| | | |
|---|---|---|
| CN | 1351775 A | 5/2002 |
| CN | 1870374 A | 11/2006 |

(Continued)

OTHER PUBLICATIONS

Chinese Patent and Trademark Office, Second Office Action for the corresponding Chinese Patent Application No. 201210437797.2 mailed Jul. 3, 2015.

(Continued)

*Primary Examiner* — Zeev V Kitov
(74) *Attorney, Agent, or Firm* — Brooks Kushman P.C.

(57) ABSTRACT

A proximity detection circuit is contemplated to detect connection of a cordset to a vehicle charging system or connection of another device to some other electrical circuit where it may be desirable to facilitate detection. A short protection circuit may be included as part of the proximity detection circuit to facilitate disconnection in the event of a shorter other condition where undesirable currents and/or voltages may be propagated to other systems of portions of the vehicle charging system.

17 Claims, 8 Drawing Sheets

(56) References Cited

U.S. PATENT DOCUMENTS

| | | |
|---|---|---|
| 7,579,807 B2 | 8/2009 | Funabashi et al. |
| 7,791,217 B2 | 9/2010 | Kamaga |
| 7,878,866 B1 | 2/2011 | Kwasny et al. |
| 8,109,139 B2 | 2/2012 | Wagner et al. |
| 8,244,422 B2 | 8/2012 | Fujitake |
| 8,450,980 B2 | 5/2013 | Kumar et al. |
| 8,749,198 B2 | 6/2014 | Klesyk |
| 8,791,666 B2 | 7/2014 | Yokoyama et al. |
| 8,945,735 B2 | 2/2015 | Kim |
| 2002/0041174 A1 | 4/2002 | Purkey |
| 2002/0081486 A1 | 6/2002 | Williams |
| 2004/0125626 A1 | 7/2004 | Kanouda et al. |
| 2004/0130288 A1 | 7/2004 | Souther et al. |
| 2004/0169489 A1 | 9/2004 | Hobbs |
| 2005/0141163 A1* | 6/2005 | Franke ............... H02H 1/063 361/94 |
| 2005/0212438 A1 | 9/2005 | Senda et al. |
| 2006/0028178 A1 | 2/2006 | Hobbs |
| 2006/0267410 A1 | 11/2006 | Kanouda et al. |
| 2007/0132457 A1* | 6/2007 | Okamoto ............. G01R 31/362 324/522 |
| 2008/0136371 A1 | 6/2008 | Sutardja |
| 2008/0205086 A1 | 8/2008 | Darroman et al. |
| 2009/0026837 A1 | 1/2009 | Lee |
| 2009/0033253 A1 | 2/2009 | Nagashima et al. |
| 2009/0034308 A1 | 2/2009 | Welchko et al. |
| 2009/0160255 A1 | 6/2009 | Grady |
| 2009/0224724 A1 | 9/2009 | Ma et al. |
| 2009/0246596 A1 | 10/2009 | Sridhar et al. |
| 2009/0322257 A1 | 12/2009 | Kim et al. |
| 2010/0017249 A1 | 1/2010 | Fincham et al. |
| 2010/0078997 A1 | 4/2010 | Chen et al. |
| 2010/0097031 A1 | 4/2010 | King et al. |
| 2010/0110741 A1 | 5/2010 | Lin et al. |
| 2010/0141203 A1 | 6/2010 | Graziano et al. |
| 2010/0165668 A1 | 7/2010 | Lin |
| 2010/0215994 A1 | 8/2010 | Kim |
| 2010/0225274 A1 | 9/2010 | Fujitake |
| 2010/0228413 A1* | 9/2010 | Fujitake ............... B60L 11/14 701/22 |
| 2010/0292890 A1 | 11/2010 | Morris |
| 2010/0295507 A1 | 11/2010 | Ishii et al. |
| 2010/0299008 A1 | 11/2010 | Mitsutani |
| 2011/0029144 A1 | 2/2011 | Muller et al. |
| 2011/0057604 A1 | 3/2011 | Capella |
| 2011/0057611 A1 | 3/2011 | Nakaso et al. |
| 2011/0095728 A1 | 4/2011 | Chen et al. |
| 2011/0121779 A1 | 5/2011 | Ichikawa et al. |
| 2011/0163722 A1 | 7/2011 | Gale et al. |
| 2011/0166725 A1 | 7/2011 | Booth et al. |
| 2011/0169447 A1 | 7/2011 | Brown et al. |
| 2011/0199048 A1 | 8/2011 | Yokoyama et al. |
| 2011/0202192 A1 | 8/2011 | Kempton |
| 2011/0204845 A1 | 8/2011 | Paparo et al. |
| 2011/0210698 A1 | 9/2011 | Sakai |
| 2012/0049796 A1 | 3/2012 | Fukatsu |
| 2012/0268065 A1 | 10/2012 | Klesyk |
| 2013/0026827 A1 | 1/2013 | Hampo et al. |
| 2013/0119755 A1 | 5/2013 | Klesyk |

FOREIGN PATENT DOCUMENTS

| | | |
|---|---|---|
| CN | 201122850 Y | 9/2008 |
| CN | 201345044 Y | 11/2009 |
| CN | 101777779 A | 7/2010 |
| CN | 201528214 U | 7/2010 |
| CN | 101801711 A | 8/2010 |
| CN | 101814725 A | 8/2010 |
| CN | 102005789 A | 4/2011 |
| CN | 102037625 | 4/2011 |
| CN | 102085861 | 6/2011 |
| CN | 102104280 | 6/2011 |
| CN | 102195224 A | 9/2011 |
| DE | 202006020319 U1 | 5/2008 |
| DE | 202008005682 | 2/2009 |
| DE | 102008047502 A1 | 4/2010 |
| KR | 20070064851 A | 6/2007 |
| WO | 2007081531 A2 | 7/2007 |
| WO | 2009037966 | 3/2009 |
| WO | 2010035676 A1 | 4/2010 |

OTHER PUBLICATIONS

Office Action for U.S. Appl. No. 13/192,559 dated Jun. 13, 2014.
Notice of Allowance for U.S. Appl. No. 13/192,559 dated Oct. 27, 2014.
Office Action for U.S. Appl. No. 13/294,423 dated Nov. 12, 2014.
Office Action for U.S. Appl. No. 13/192,559 dated Dec. 24, 2014.
Office Action for U.S. Appl. No. 13/091,214 dated May 20, 2014.
Final Office Action for U.S. Appl. No. 13/091,214 dated Dec. 17, 2014.
Office Action for U.S. Appl. No. 13/192,559 dated May 7, 2015.
Office Action for U.S. Appl. No. 13/091,214 dated Apr. 17, 2015.
Chinese Patent Application No. 201210437797.2, Office Action dated Oct. 20, 2014.
Notice of Allowance for U.S. Appl. No. 13/294,423 dated Aug. 10, 2015.
Notice of Allowance for U.S. Appl. No. 13/192,559 dated Sep. 10, 2015, 7 pages.
Office Action for U.S. Appl. No. 13/091,214 dated Sep. 24, 2015, 28 pages.

* cited by examiner

PROXIMITY DETECTION CIRCUIT HAVING SHORT PROTECTION

TECHNICAL FIELD

The present invention relates to proximity detection circuits having short protection, such as but not limited to the type suitable for use with on-board vehicle chargers to detect connection to a cordset or other element used to facilitate vehicle charging.

BACKGROUND

An on-board vehicle charger may be used to charge a high voltage battery or other energy storage device found in a hybrid electric or electric vehicle to provide energy to an electrically powered motor or other vehicle system. In some cases, the charging may be facilitated with a cordset or other element having capabilities to facilitate delivering current to the on-board charger, such as from a wall charger or other type of non-vehicle positioned charging station. The cordset may include an adaptor to facilitate attachment to an outlet or other receptacle associated with the on-board charger. The on-board charger may include electronics or other elements to control and manage current flow to the high voltage battery and other the related charging operations.

SUMMARY

One non-limiting aspect of the present invention contemplates a proximity detection circuit for use in awakening a microcontroller to detect connection of a charging cordset to a receptacle of a vehicle charging system. The proximity detection circuit may include a low-voltage power supply; a pulse signal generating circuit operable to generate a first signal having a first duration, the pulsed signal generating circuit being powered by the low-voltage power supply; a connection circuit configured to adjust an input voltage of the pulse signal generation circuit upon connection of the charging cordset to the vehicle charging system in order to enable the pulse signal generating circuit to generate the first signal, the connection circuit being powered by the low-voltage power supply; and a short protection circuit configured to disconnect the connection circuit from the low-voltage power supply.

One non-limiting aspect of the present invention contemplates the connection circuit includes a first switch connected to the low-voltage power supply, the first switch being operable between an opened state and a closed state, wherein the short protection circuit actuates the first switch to the opened state in order to disconnect the connection circuit from the low-voltage system.

One non-limiting aspect of the present invention contemplates a drain of the first switch is connected directly to the low-voltage power supply such that a drain voltage at the drain approximately equals a voltage of the low-voltage power supply One non-limiting aspect of the present invention contemplates the short protection circuit is configured to disconnect the connection circuit from the low-voltage system upon occurrence of a reverse current flow through the connection circuit.

One non-limiting aspect of the present invention contemplates the short protection circuit is configured to determine the reverse current flow without measuring current and without measuring voltage.

One non-limiting aspect of the present invention contemplates the reverse current flow occurs through a resistor used to set the input voltage of the pulse signal generating circuit when the charging cordset is disconnected from the receptacle.

One non-limiting aspect of the present invention contemplates the connection circuit includes a first switch connected between the low-voltage power supply and the resistor, the first switch being operable between an opened state and a closed state, wherein the short protection circuit operates the first switch to the opened state upon occurrence of the reverse current flow.

One non-limiting aspect of the present invention contemplates the short protection circuit includes a second switch that switches from an opened state to a closed state upon occurrence of the reverse current flow, and wherein the first switch is operated to the opened state after the second switch switches to the closed state.

One non-limiting aspect of the present invention contemplates the second switch is configured to be in the opened state when a forward current flow occurs through the resistor.

One non-limiting aspect of the present invention contemplates the forward current flow occurs through a pin of the charging cordset when the cordset is connected to the receptacle.

One non-limiting aspect of the present invention contemplates a latching circuit operable to process the first signal into a second signal having a second duration, the second signal being provided to awaken the microcontroller, the second duration being longer than the first duration.

One non-limiting aspect of the present invention contemplates the first duration is shorter than a wake-up duration required to awaken the microcontroller, wherein the second duration is at least equal to the wake-up duration.

One non-limiting aspect of the present invention contemplates a proximity detection circuit for a vehicle charging system comprising: a low-voltage power supply; a connection circuit configured to generate a signal upon connection of a charging cordset to the vehicle charging system, the connection circuit being powered by the low-voltage power supply; and a protection circuit configured to disconnect the connection circuit from the low-voltage power supply upon occurrence of a reverse current flow to the low-voltage power supply.

One non-limiting aspect of the present invention contemplates the connection circuit and the protection circuit to in total consume less than 200 µA from the low-voltage power supply when a cordset is disconnected from the vehicle charging system.

One non-limiting aspect of the present invention contemplates the connection circuit is directly connected to the low-voltage power supply such that a voltage input to the connection circuit from the low-voltage power supply approximately equals a voltage output of the low-voltage power supply.

One non-limiting aspect of the present invention contemplates the connection circuit includes a first switch and a resistor, the first switch being connected between the resistor and the low-voltage power supply, the resistor being connected between the low-voltage power supply and a vehicle ground, the reverse current flow occurring through the resistor and the first switch.

One non-limiting aspect of the present invention contemplates the protection circuit includes a second switch connected to the first switch, the second switch being configured to an opened position when a forward current flows through the resistor and the first switch, the second switch being configured to a closed position when the reverse current flows through the resistor and the first switch, the second switch being configured to open the first switch when the second switch is in the closed position.

One non-limiting aspect of the present invention contemplates a proximity detection circuit for use within a vehicle having a vehicle charging system configured to facilitate charging a vehicle upon connection of a charging cordset, the detection circuit comprising: a connection portion configured to output a first voltage when the charging cordset is disconnected from the vehicle charging system and a second voltage when the charging cordset is connected to the vehicle charging system, the connection portion having an input configured to receive current from a low-voltage power supply; and a protection portion configured to disconnect the input from the low-voltage power supply upon occurrence of a reverse current flow through the connection portion.

One non-limiting aspect of the present invention contemplates the connection portion includes a switch at the input, the switch being connected directly to the low-voltage power supply such that a voltage output from the low-voltage power supply approximately equals an input voltage at the input, and wherein the protection portion is configured to open the switch upon occurrence of reverse current.

One non-limiting aspect of the present invention contemplates the connection portion and the protection portion in total consume less than 150 μA of current from the low-voltage power supply when the charging cordset is disconnected.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
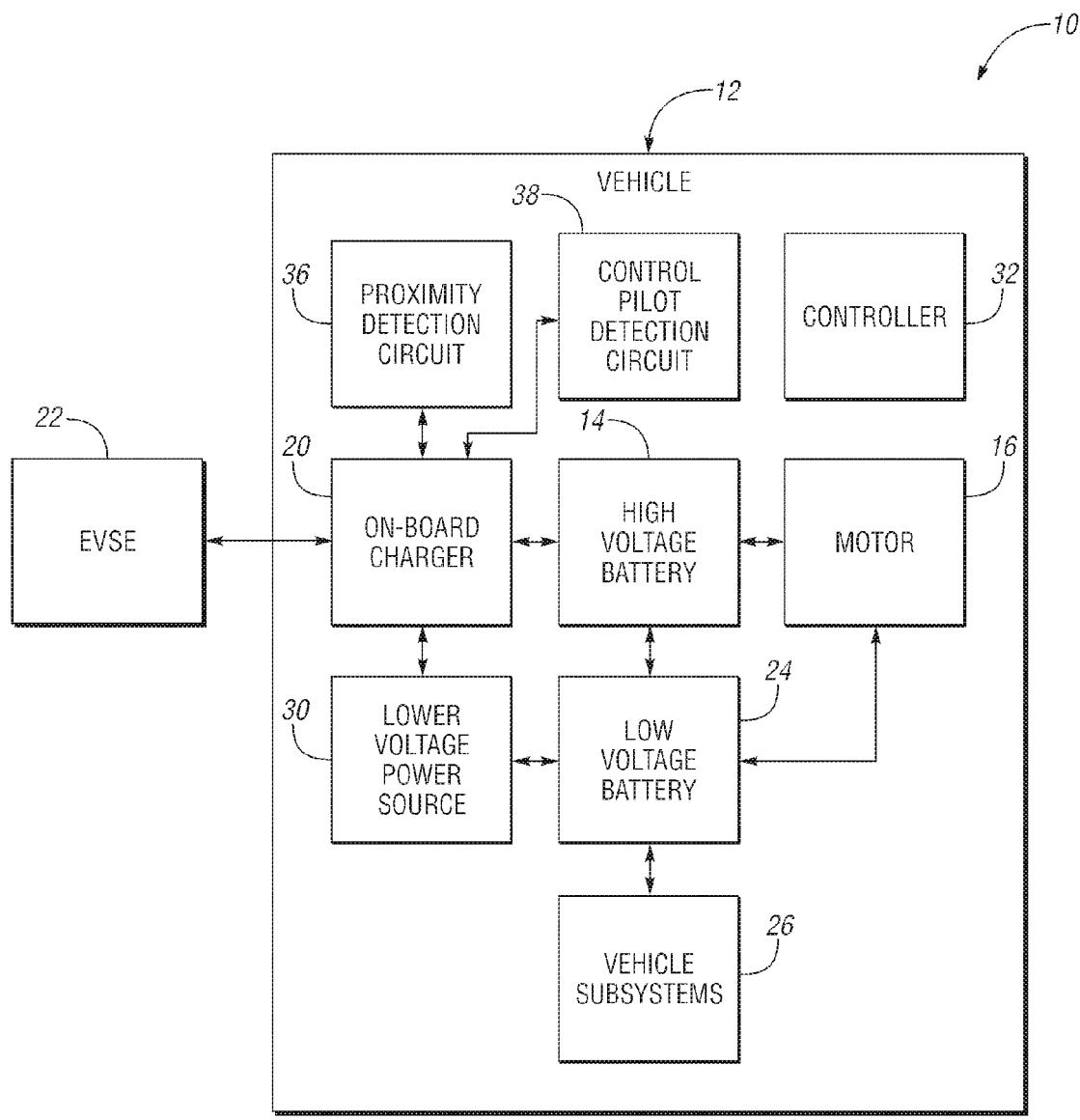
FIG. 1 schematically illustrates logical elements associated with a vehicle power system as contemplated by one non-limiting aspect of the present invention.

FIG. 1 functionally illustrates logical elements associated with a vehicle power system 10 in accordance with one non-limiting aspect of the present invention. The vehicle power system 10 is shown and predominately described for use within an electric vehicle, hybrid electric vehicle, or other vehicle 12 having a high voltage battery 14 or other energy source operable to provide energy sufficient for use by an electric motor 16 to drive the vehicle 12. The vehicle 12 may include an on-board charger 20 to facilitate charging the high voltage battery 14 with current delivered through an electric vehicle supply equipment (EVSE) system 22, which may include a cordset to connect the on-board charger to a wall charger or other charging station (not shown). The EVSE system 22 may be used to deliver current through a cable having a terminal (not shown) at one end adapted for receipt within a receptacle or outlet (not shown) associated with the on-board charger 20. U.S. Pat. No. 7,878,866, the disclosure of which is hereby incorporated by reference in its entirety herein, discloses such an arrangement that may be used in accordance with the present invention.

The on-board charger 20 may include electronics or other elements operable to control and manage current flow used to support charging related operations for the high voltage battery 14, and optionally, to support charging or otherwise powering a low voltage battery 24, one or more vehicle subsystem 26, and/or other electronically operable elements included within the vehicle 12. The low voltage battery 24 may be included to support powering vehicle systems 26 that operate at voltages lower than the electric motor 16, such as but not limited to remote keyless entry systems, heating and cooling systems, infotainment systems, braking systems, etc. In addition to being charged with energy provided through the EVSE system 22, one or more of the high and low voltage batteries 14, 24 and vehicle subsystems 26 may be operable to power each other and/or to be powered with energy generated by the electric motor 16.

The low voltage battery 24, for example, may be operable to provide energy sufficient for use by a lower voltage power source 30. The lower voltage power source 30 may be a system operable to regulate current from the low voltage battery 24 for use with one or more of the vehicle subsystems 26 and/or the on-board charger 20, e.g., for lower powering of microcontrollers and other voltage sensitive processors associated therewith. A controller 32 may be included to facilitate executing logical operations and undertaking other processing requirements associated with controlling the on-board charger 20 and/or controller other systems within the vehicle 12 (optionally, one or more of the elements may include their own controller or processor). For exemplary purposes, the terms 'lower', 'low', and 'high' are used to differentiate voltage levels respectively coinciding with approximately 5VDC, 12VDC, and at least 200VDC, which are commonly used within vehicles to support the operation associated with each of the corresponding energy sources. This is done without intending to unnecessarily limit the scope and contemplation of the present invention as the present invention fully contemplates the energy sources having the same or different voltage levels and/or current production/generation capabilities.

A proximity detection circuit 36 may be included to facilitate a current conservative configuration operable to facilitate registering connection of the EVSE system 22 to the on-board charger 20 while the controller is in the sleep or inactive state. The proximity detection circuit 36 may be operable to transition the controller 32 from the sleep state to the active state, optionally while consuming less than 50-200 uA (which may be a design parameter), such as with a configuration similar to that described within U.S. patent application Ser. No. 13/091,214, the disclosure which is hereby incorporated by reference in its entirety. The proximity detection circuit 36 may be configured to facilitate allowing the controller 32 to remain in a low energy consumption state (e.g., where the controller 32 may be unable to detect connection of the EVSE system 22 or perform other operations) in order to limit the amount of consumed energy while still allowing the controller 32 to be awoken to perform its prescribed operations once the EVSE system 22 is connected or some other event takes places (the other events may relate to other triggering operations associated with capabilities that are unavailable while the controller 22 is in sleep mode). The ability to consume, in some cases, less than 100 μA while asleep, is particularly important to the present invention in order to assure minimum current draw within vehicles having high sensitivities to current consumption, e.g., hybrid or hybrid electric vehicles.

A control pilot detection circuit 38 may be included to facilitate a current conservative configuration operable to facilitate output of a control pilot wake-up signal to the controller 32. The control pilot detection circuit 38 may be configured to generate the control pilot wake-up signal by processing a control pilot signal output from the EVSE system 22. The controller 32 may rely on the control pilot wake-up signal to assess whether the EVSE system 22 is capable of providing charge sufficient to facilitate charging the high-voltage battery 14 and/or other parameters associated with such a charging operation. The control pilot wake-up signal may be provided through the cordset or other adapter of the EVSE system 22 used to connect to the on-board charger 20. Optionally, the control pilot wake-up signal may be generated to comply with the requirements of Society of Automotive Engineer (SAE) J1772 and International Electrotechnical Commission (IEC) 51851, the disclosures of which are hereby Incorporated by reference in their entirety.

Figure 2:
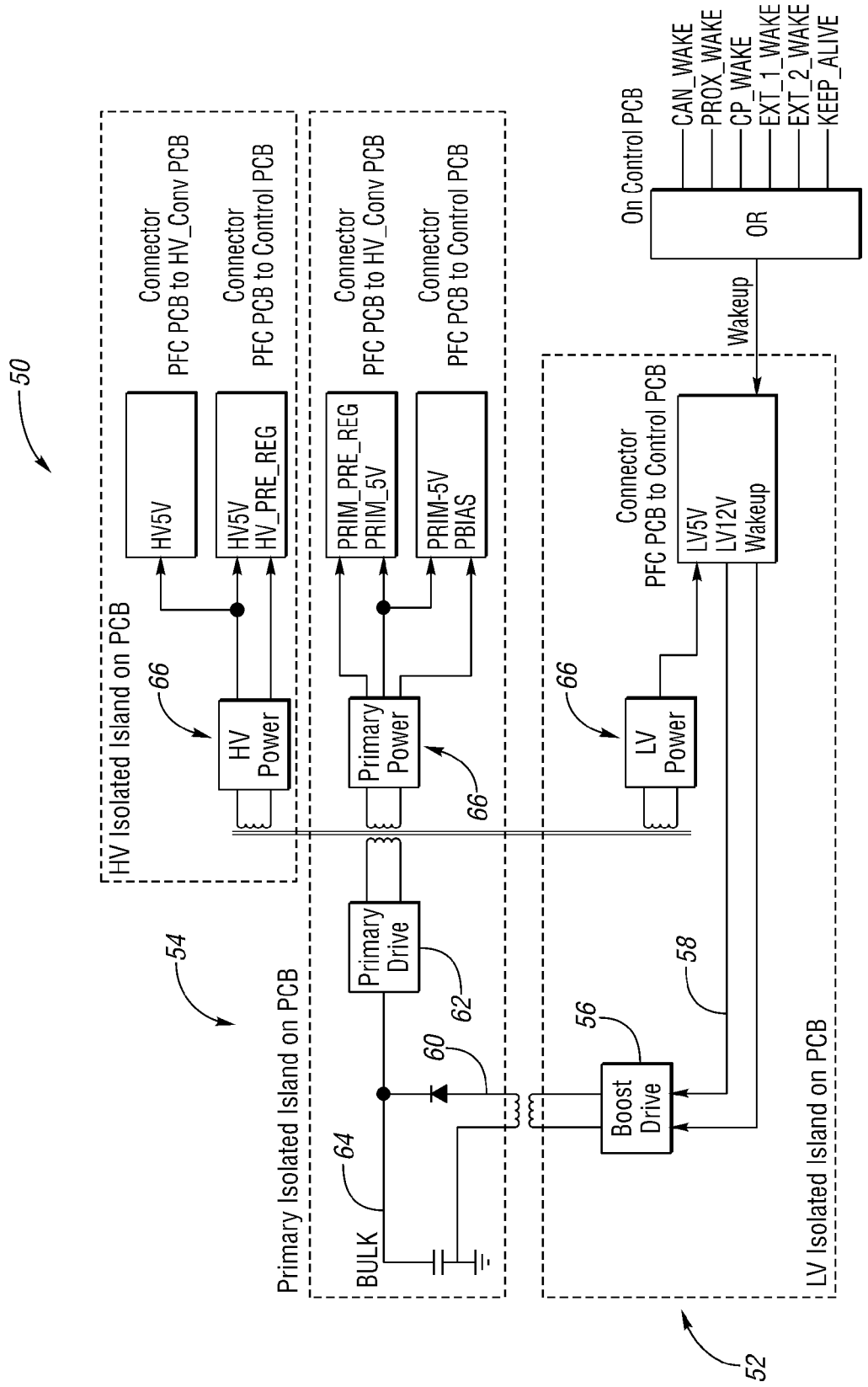
FIG. 2 schematically illustrates a multistage power supply system as contemplated by one non-limiting aspect of the present invention.

FIG. 2 schematically illustrates a multistage power supply system 50 operable with the control pilot wake-up and proximity detection signals in accordance with one non-limiting aspect of the present invention. The multistage power system 50 may correspond with or be included as part of the on-board charger 20 and/or one or more of the other features schematically illustrated in FIG. 1. The multistage power supply system 50 may be of the type described in U.S. patent application Ser. No. 13/192,559, the disclosure of which is hereby incorporated by reference in its entirety. The multistage power supply system 50 may rely on the control pilot wake-up signal (CP_WAKE) and/or the proximity detection wake-up signal (PROX_WAKE) to be received by a controller or other processing associated with the multistage power supply system 50. Of course, the present invention is not necessarily limited to use of the control pilot detection circuit 38 to output the control pilot wake-up signal to the multistage power supply system 50 shown in FIG. 2 and fully contemplates its use and application to other charging systems, and not, necessarily just to exemplarily described vehicle-based charging systems.

The multistage power supply system 50 may comprise a first stage 52 and a second stage 54. The first and second stages 52, 54 of the multistage power supply 50 may be provided in series communication with each other. The first stage 52 of the multistage power supply system 50 comprises a converter 56 for receiving a low voltage input 58 from a vehicle battery (not shown), which may be a 12 volt DC input. The first stage converter 56 may also be operable for converting the vehicle battery low voltage input 58 to a high voltage output 60, which may be a 100 volt DC output. In that regard, the first stage converter 56 may comprise a boost converter for boosting a low voltage 12 volt DC input from the vehicle battery to a high voltage 100 volt DC output. The second stage 54 may comprise a converter 62 for receiving either a rectified AC high voltage input 64 or the high voltage output 60 from the first stage 52. The second stage converter 62, which may be an isolated flyback converter, is also for converting the rectified AC high voltage input 64 or the first stage high voltage output 60 to a low voltage output 66, which may be a 5 volt DC output, for use in powering vehicle control circuitry.

Figure 3:
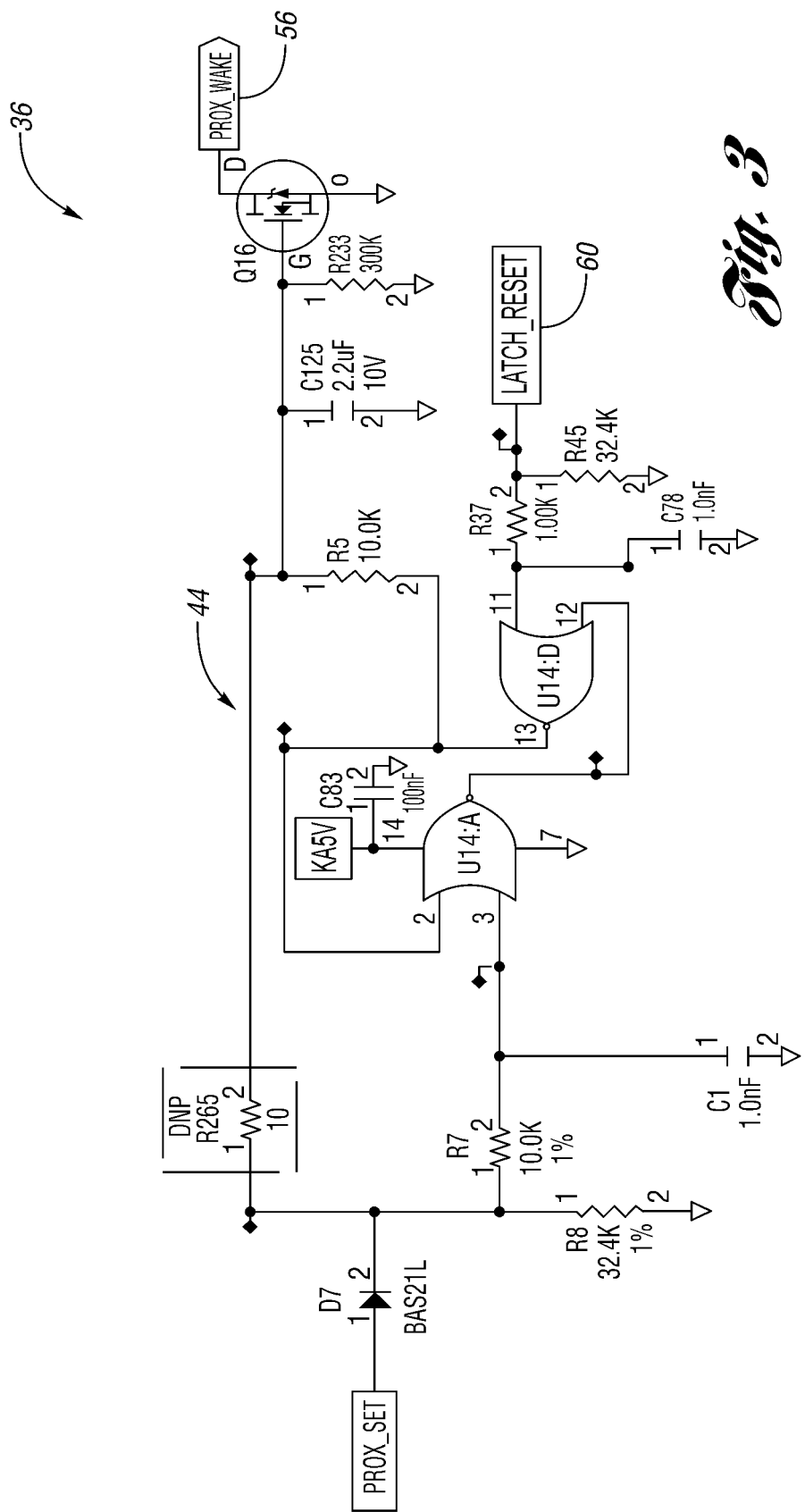
FIG. 3 illustrates a proximity detection circuit as contemplated by one non-limiting aspect of the present invention.
Figure 3:
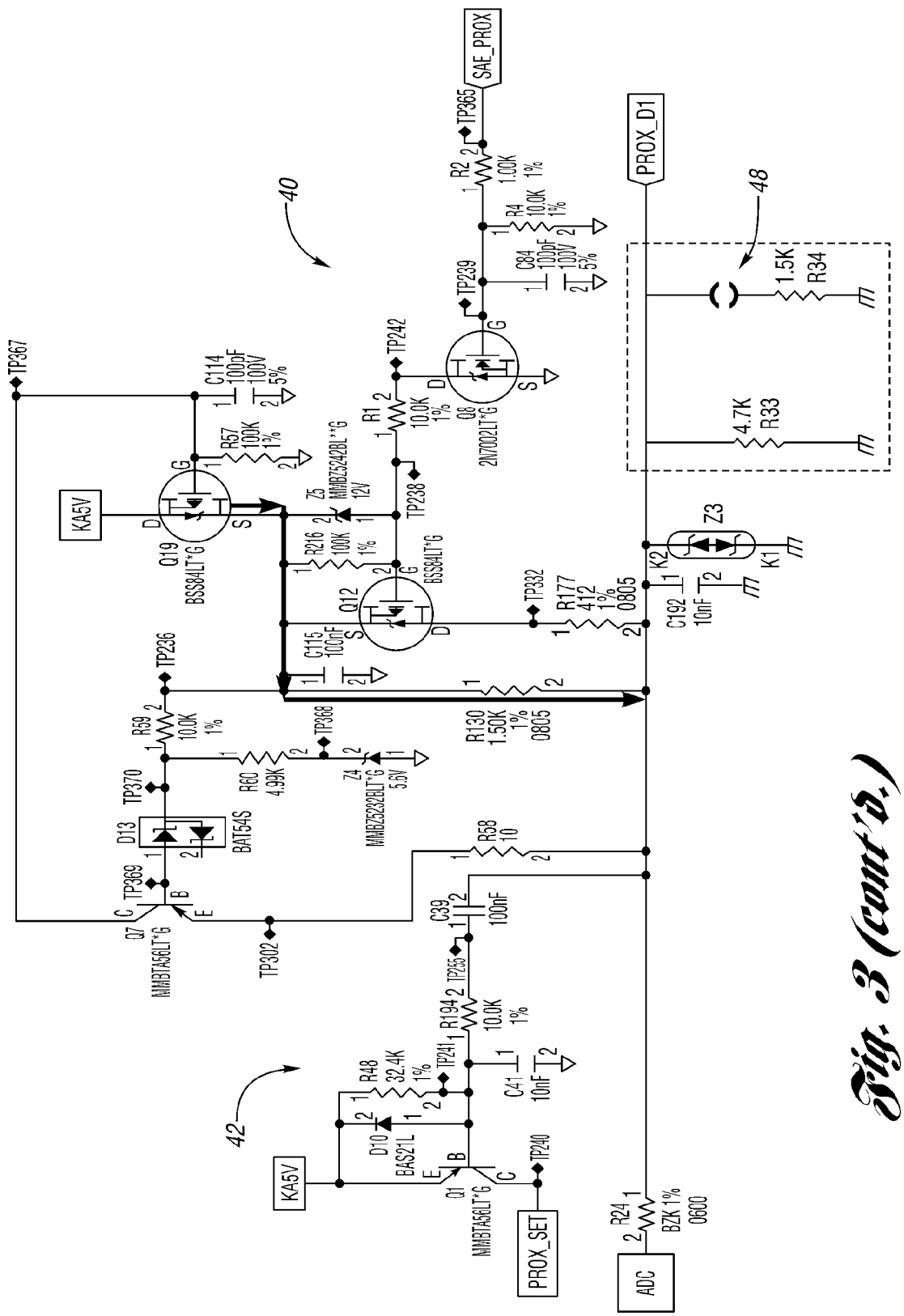

FIG. 3 schematically illustrates the proximity detection circuit 36 in accordance with one non-limiting aspect of the present invention. The proximity detection circuit 36 is intended to describe the operation of the circuit related elements (switches, resistors, capacitors, diodes, etc.) shown in FIG. 1. The values assigned to these elements and the described use of the elements is not intended to necessarily require that value/element or that the same is part of a dedicated circuit. Rather, the circuit elements may be part of any one or more of the logical elements shown in FIG. 1, i.e., some or all of the illustrated circuit components may be included in some or all of the on-board charger 20, the lower voltage power source 30, the vehicle subsystems 26, the controller 32, the motor 16, etc. While multiple circuit elements are shown to achieve certain results, the present invention fully contemplates the use of other circuit elements to achieve similar results, particularly the use of other current conservative elements.

The constant 5VDC may be used to power switches and bias other elements of the circuit 36 while the controller is in either one of the sleep and/or active states. The configuration shown in FIG. 3 relies on the 5VDC to power a connection circuit 40, a wake-up signal generating circuit 42, and an optional latching circuit 44. The connection generating circuit 40 may be configured to generate a signal, such as a voltage change, suitable for use in prompting the wake-up signal generating circuit 42 to output a pulsed signal for use in awakening the controller 32. In the event a duration/length of the pulsed signal is less than a duration needed to awaken the controller 32, the latching circuit 44 may be used to elongate the pulse signal, or to otherwise process it, into a signal sufficient to transition the controller 32 from the sleep state to the active state. Once the controller 32 is awoken, it may be configured to monitor a voltage at a PROX_D1 node to determine connection of the cordset 22 and an optional analog to digital component (ADC) may be used to support other software processing based on measured voltage.

FIG. 3 illustrates a forward current path (arrowed lines) through the connection and wake-up signal generating circuits 40, 42 when the cordset 22 is disconnected. The controller 32 presumably is in the sleep state at this point due to a prior shutdown event that transitioned the controller 32 to the sleep state upon detection of the PROX_D1 value indicating disconnection of the cordset 22. The controller 32 may be in the active state to complete or perform other operations or in the process of transitioning to the sleep state while the illustrated current path is active. When the cordset 22 is disconnected, switch Q1 is open, Q19 is closed, Q12 is open, switch Q8 is open, a PROX voltage set by the controller is zero, and a terminal 48 of the vehicle-based receptacle used to receive a proximity pin (not shown) of the cordset 22 is empty. This results in the illustrated current path through Q19 and R130. Optionally, the forward current path may extend through the resistor R33 used to represent a resistance of the on-board vehicle receptacle configured to receive the cordset. (The wake-up signal generating circuit 42 has no current path since a voltage on either side of the capacitor C39 is constant.)

Upon connection of the cordset to the receptacle, a pin (not shown) within the cordset establishes electrical connection with the connection circuit 40 through terminal 48, which is shown with the resistor R34. The controller, unless previously awoken, is in the sleep state at least for a short period of time after connection of the cordset 22. Connection of the cordset 22 results in the proximity pin being inserted within the corresponding terminal receptacle 48 and becoming part of the connection circuit 40. The inserted pin conducts current through the terminal 48 such that resistor R34 becomes connected to a connection node 50 between R130 and R33, effectively lowering a voltage at the connection node 50. The lowered connection node voltage reduces the voltage on one side of the capacitor C39, and thereby, initiates a charging operation of the capacitor C39 with energy from the 5VDC power supply. The flow of current through the emitter and base of switch Q1 caused by charging of the capacitor C39 transitions switch Q1 from an open to a closed state, resulting in approximately a 5V pulse at a PROX_SET node associated with the collector of switch Q1.

Figure 4:
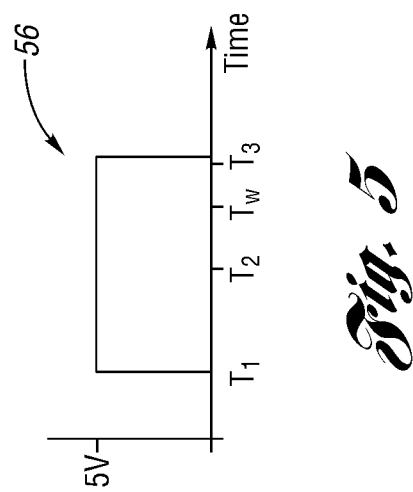
FIG. 4 illustrates a pulsed signal output from a wake-up signal generating circuit in accordance with one non-limiting aspect of the present invention.

FIG. 4 illustrates a pulsed signal output 54 from the PROX_SET node of the wake-up signal generating circuit 42. The pulsed signal 54 may be characterized as a single pulsed signal having a duration from time T1 to time T2 wherein time T1 corresponds with the charging of capacitor C39 and time T2 corresponds with capacitor C39 becoming charged. The duration between time T1 and time T2 is proportional to a capacitance of the capacitor C39 and can be varied by changing the capacitance. One non-limiting aspect of the present invention contemplates capacitor C39 having a capacitance of less than 150 nF, such as 100 nF, in order to limit its size (a larger capacitor may be more expensive and have a slower rise time). Of course, the present invention fully contemplates the use of any sized capacitor and is not intended to be necessarily limited to the noted capacitances.

Figure 5:
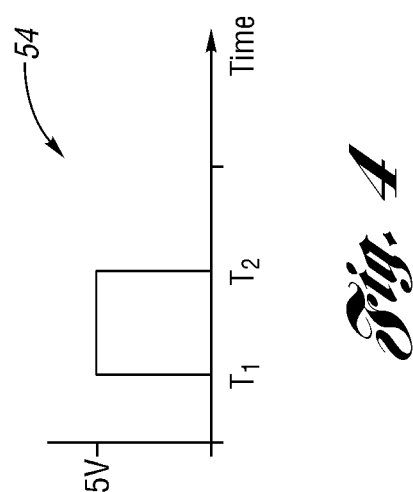
FIG. 5 illustrates a pulsed signal output from a latching circuit in accordance with one non-limiting aspect of the present invention.

The duration of the single pulsed signal output at the PROX_SET node may be less than a duration needed to awaken the controller 32. The PROX_SET signal 54 is illustrated to have a duration of less than 50 mS (shown as 25 mS) whereas the controller 32 may be of the type requiring at least a 50 mS pulse in order to transition from the sleep state to the active state. In order to reduce costs and achieve desired signal rise times, one non-limiting aspect of the present invention contemplates including the latching circuit 44 to elongate the PROX_SET signal 54 instead of simply increasing the size of capacitor C39. FIG. 5 illustrates a pulsed signal output 56 from the latching circuit 44 to awaken the controller 32. The pulsed signal 56 has a longer duration (shown to be up to time T3) than a time Tw needed to awaken the controller 32.

As shown in FIG. 3, the PROX_SET pulse signal 54 may be output from the PROX_SET node to an input of the latching circuit 44. The latching circuit 44 may then elongate the signal or perform other processing to generation a WAKE_UP signal output 56 to the controller 32. Once awoken, the controller 32 may set a LATCH_RESET signal 60 to reset the latching circuit 44 for generation of subsequent WAKE-UP signals 56. The awoken controller 32 may then determine connection of the cordset 22 based the voltage at the connection node. Optionally, the controller 32 may be configured to support two or more connection states, such as to support connection detection voltages required by Society of Automotive Engineer (SAE) J1772 and International Electrotechnical Commission (IEC) 51851. These connection states may be supported by the controller 32 controlling the addition of resistor R177 to the current path through the connection circuit 40.

FIG. 3 illustrates the SAE J1772 connection status by way of resistor R177 being added to the current path with the controller 32 providing a PROX signal to a PROX input to activate switches Q12 and Q8. The SAE_PROX signal may be provided by the controller 32 immediately after awakening according to prior software programming. The addition of resistor R177 changes the voltage at the connection node to meet the SAE J1772 requirement. The resulting voltage change then induces a discharging of the capacitor C39 through the 5VDC power source of the wake-up signal generating circuit 42 in the illustrated current path. In the event the IEC 51851 standard is used, the resistor R177 is not connected in parallel with resistor R130 and the current path through the 5VDC power source of the wake-up signal resulting from discharging of the capacitor C39 is delayed until removal of the proximity pin from the terminal.

Once the proximity pin is removed from the terminal 48, the controller 32 detects the corresponding voltage change at the connection node 50 and automatically transitions to the sleep state. The transitioning to the sleep state may include removing resistor R177 from the current path with deactivation of the switch Q8. The removal of resistor R177 can be done to reduce current consumption (quiescent current) of the connection circuit 40 to less than 150 uA, and preferably less than 100 uA, depending on the component values remaining in the current path. The ability to control the quiescent current may be beneficial in achieving desired proximity (connection) detection while minimizing energy consumption.

Figure 6:
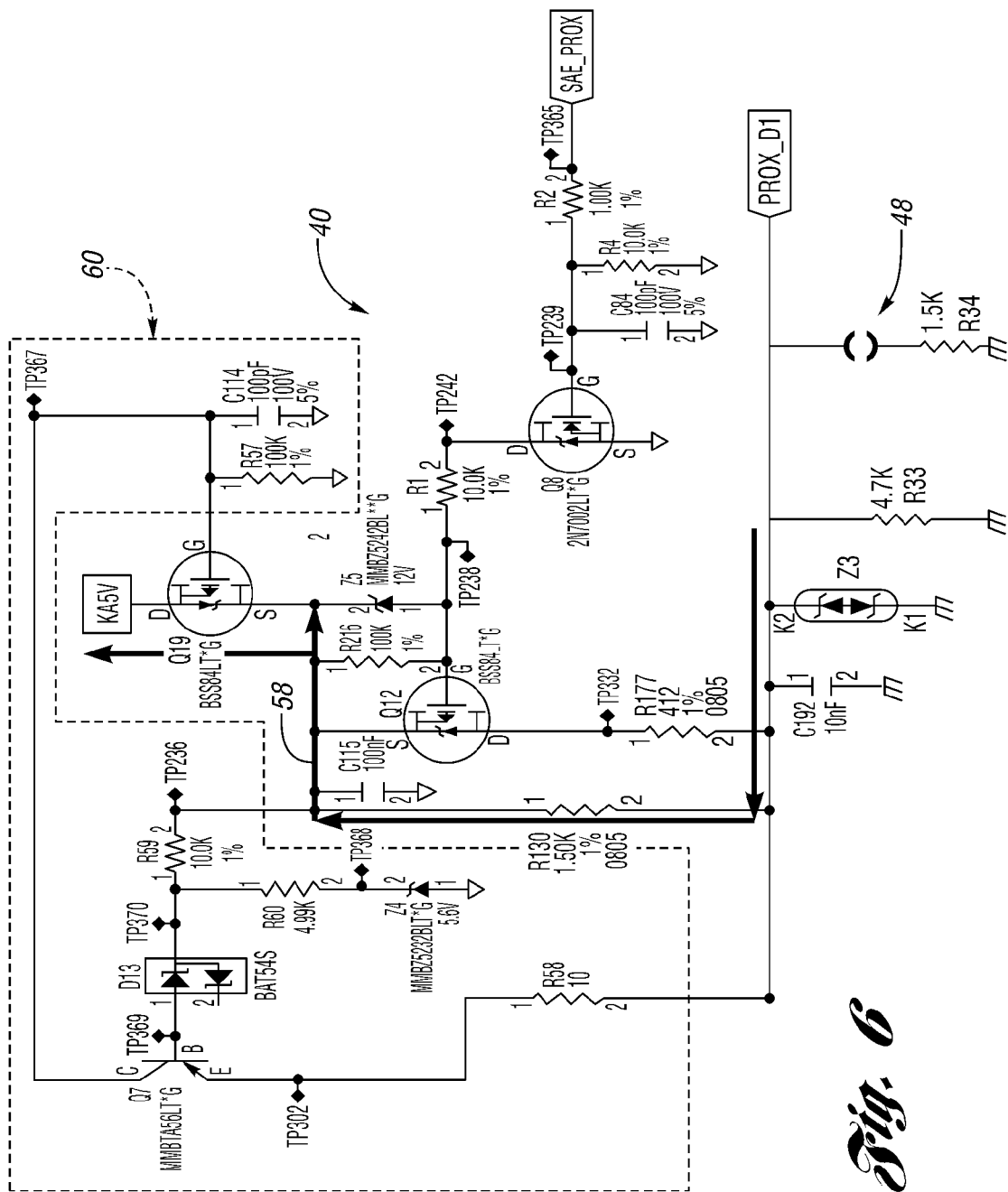
FIG. 6 illustrates a reverse current flow in accordance with one non-limiting aspect of the present invention.

FIG. 6 illustrates a reverse current flow 58 (arrowed lines) in accordance with one non-limiting aspect of the present invention. The reverse current flow may result from a shorting of the PROX_D1 node to the low voltage battery 24, or some other energy source within the vehicle. The reverse current flow may be associated with any shorting, ground float, or abnormal condition in which a voltage differential is sufficient to cause the reverse current flow. The reverse current flow is shown to correspond with current flowing through the resistor R130 and the switch Q19 towards the lower-voltage power source 20 (KA5V). The reverse current flow, however, is intended to represent one of one or more conditions in which current may be output to the lower voltage power supply 20. The reverse current flow may be undesirable in that it may damage the lower voltage power supply 20 and/or increase voltage inputs to other devices connected to the lower voltage power supply 20, which may harm those devices and/or components.

One solution contemplated by the present invention to prevent the reverse current flow from being output to the lower voltage power supply 20 includes the use of a diode (not shown) between the switch Q19 and the low-voltage power supply 20. The switch Q 19 may be directly connected to the output of the lower voltage power supply 20 in that a voltage output from the lower voltage power supply is equal to or approximately equal to a drain voltage at a drain of the switch Q19, which would not be the case in the event a diode were to be connected between the lower voltage power supply 20 and the switch Q19.

The ability of the present invention to rely on the switch Q19 to prevent reverse current flow to the lower voltage power supply 20, without reliance on a diode, may be beneficial in limiting the quiescent current. One non-limiting aspect of the present invention contemplates the proximity detection circuit including a short protection circuit 60 to facilitate control of the switch Q19. The short protection circuit 60 may be a non-software based circuit configured to automatically facilitate opening and closing of the switch Q19 without having to measure current and/or voltage and/or without having to rely on a signal processor or other logically executing device, e.g., it may be a hardware solution.

Figure 7:
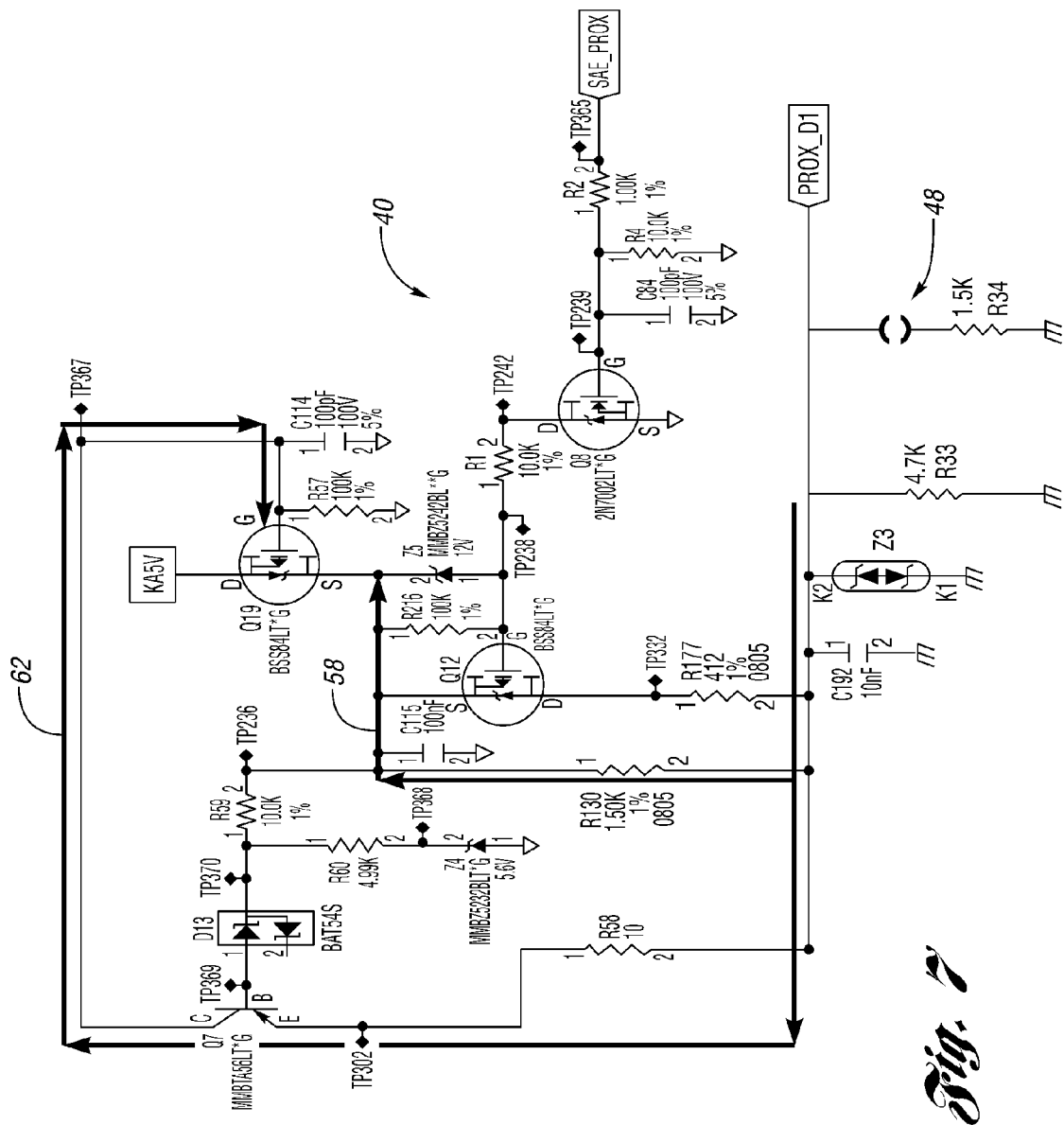
FIG. 7 illustrates a short current flow in accordance with one non-limiting aspect of the present invention.

The short protection circuit 60 is shown to be comprised of a resistor R 58, a switch Q7, a Zener diode pair D13, a resistor R 60, a Zener diode Z4, a resistor R59, a resistor R57, and a capacitor C114. These components, as shown in FIG. 7, may be used to provide a short current path 62 (arrowed lines) through the short protection circuit 60 upon occurrence of the reverse current flow 58. The short current path may be used to bias the gate of the MOSFET Q19 to a voltage greater than the source so that the MOSFET opens (turns off). Depending on design considerations of the short protection circuit 60, the lower voltage power supply 20, and/or the connection circuit 40, a certain amount of current/voltage may be required to open the switch Q19.

For exemplary and non-limiting purposes, the present invention is described with respect to the lower voltage power supply 20 being configured to supply 5VDC. Give this supply and that the voltage sensitive devices connected thereto may have a voltage tolerance up to 7-8VDC, one non-limiting aspect of the present invention contemplates preventing opening of the switch Q19 until conditions are such that 6.5VDC would be output from the connection circuit 40 to the lower voltage power supply 20 in the absence of opening the switch Q19. Of course, the present invention is not necessary limited to this particular turn-on voltage (6.5 VDC) and fully contemplates the use of any other suitable voltage values, which may be achieved by adjusting values for one or more of the components included as part of the short protection circuit in/were the connection circuit.

As shown, once the turn-on voltage is exceeded, the short current path is established through the switch Q7. Once the switch Q7 closes, the short current then begins to flow to the gate of the switch Q19 at which point the switch Q19 opens. The switch Q19 will remain open as long as the gate voltage is sufficiently greater than the source voltage, i.e., as long as the short current 62 is sufficiently provided. In the event the condition causing the short current 62 ameliorates or ceases, the switch Q19 will automatically close. Once the switch Q 19 is closed, the connection circuit 40 returns to normal operation to permit detection of the cordset in awakening of the microcontroller. In order to ensure a proper biasing of the switch Q7, the diodes D13 and the voltage divider (R 59, R 60) may be used in combination with the switch set resistor R58. In this manner, non-limiting aspect of the present invention contemplates the short circuit 60 being operable to disconnect the connection portion from the lower voltage power supply 20 upon occurrence of a sufficient triggering or shorting event.

Figure 8:
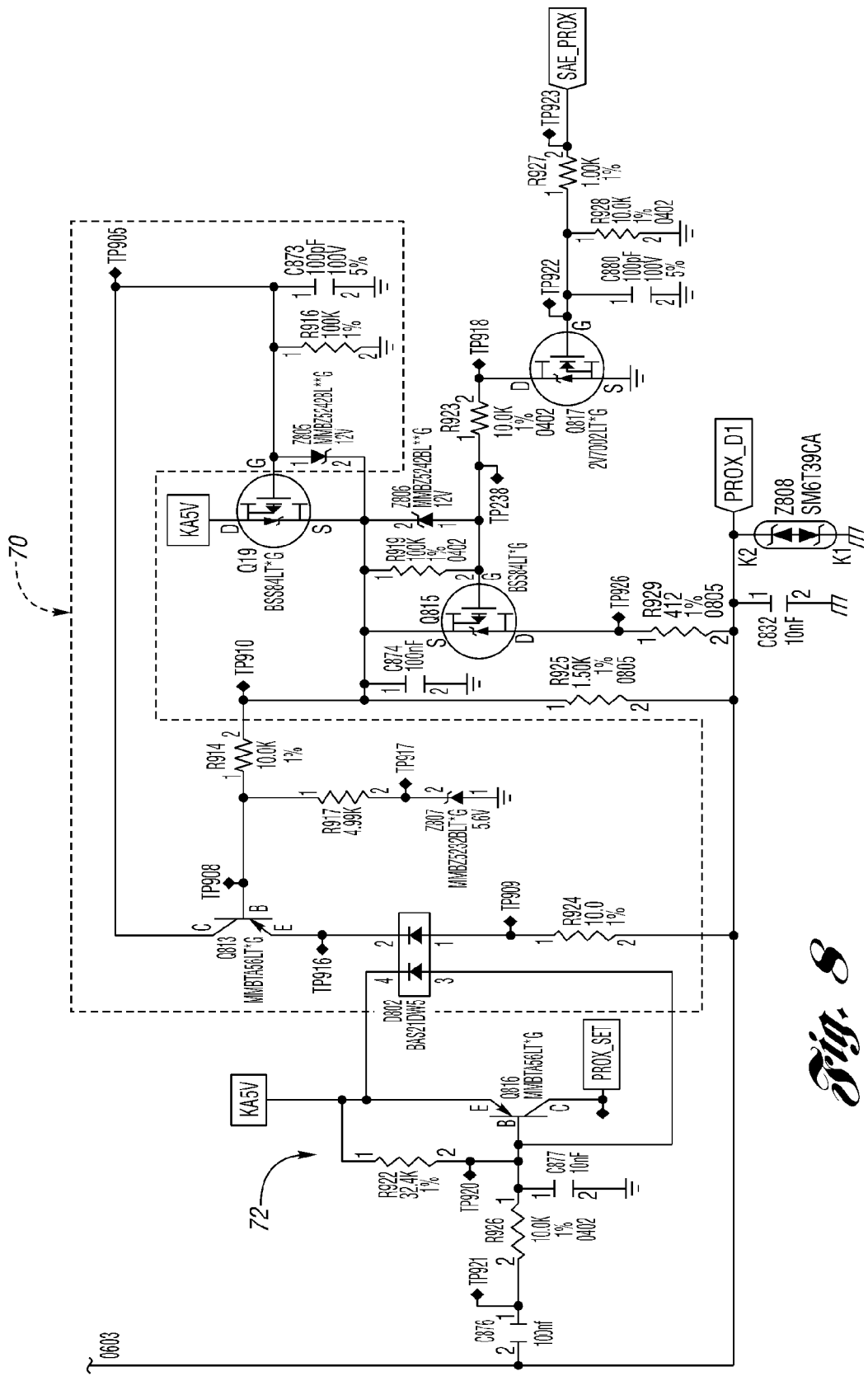
FIG. 8 illustrates a short protection circuit in accordance with one non-limiting aspect of the present invention.

FIG. 8 illustrates a short protection circuit 70 in accordance with one non-limiting aspect of the present invention. The short protection circuit 70 may be configured to operate with the above-described connection circuit 40 and a modified wake-up circuit 72. The short protection circuit 70 may generate in a manner similar to the short protection circuit 60 described above, at least with respect to facilitate by seeing of a switch Q814 used to facilitate disconnecting the connection circuit 40 from the lower voltage power supply 20. The short protection circuit 70 may be beneficial over the short connection circuit 60 shown above in that it eliminates the use of the diodes D13 at the drain of the switch Q7 in favor of a diode pair D802 they can be shared with the wake-up circuit 72, which may be slightly adjusted as illustrated. The short protection circuit may also add a Zener diode Z805 between the gate and source of the switch Q814 in order to further define and facilitate control of the switch Q814 between an opened state and a closed state.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A proximity detection circuit for use in awakening a microcontroller to detect connection of a charging cordset to a receptacle of a vehicle charging system, the proximity detection circuit comprising:
    a low-voltage power supply;
    a pulse signal generating circuit operable to generate a first signal having a first duration, the pulsed signal generating circuit being powered by the low-voltage power supply;
    a connection circuit configured to adjust an input voltage of the pulse signal generation circuit upon connection of the charging cordset to the vehicle charging system in order to enable the pulse signal generating circuit to generate the first signal, the connection circuit being powered by the low-voltage power supply; and
    a short protection circuit configured to disconnect the connection circuit from the low-voltage power supply.

2. The proximity detection circuit of claim 1 wherein the connection circuit includes a first switch connected to the low-voltage power supply, the first switch being operable between an opened state and a closed state, wherein the short protection circuit actuates the first switch to the opened state in order to disconnect the connection circuit from the low-voltage power supply.

3. The proximity detection circuit of claim 2 wherein a drain of the first switch is connected directly to the low-voltage power supply such that a drain voltage at the drain approximately equals a voltage of the low-voltage power supply.

4. The proximity detection circuit of claim 1 wherein the short protection circuit is configured to disconnect the connection circuit from the low-voltage power supply upon occurrence of a reverse current flow through the connection circuit.

5. The proximity detection circuit of claim 4 wherein the short protection circuit is configured to determine the reverse current flow without measuring current and without measuring voltage.

6. The proximity detection circuit of claim 4 wherein the reverse current flow occurs through a resistor used to set the input voltage of the pulse signal generating circuit when the charging cordset is disconnected from the receptacle.

7. The proximity detection circuit of claim 6 wherein the connection circuit includes a first switch connected between the low-voltage power supply and the resistor, the first switch being operable between an opened state and a closed state, wherein the short protection circuit operates the first switch to the opened state upon occurrence of the reverse current flow.

8. The proximity detection circuit of claim 7 wherein the short protection circuit includes a second switch that switches from an opened state to a closed state upon occurrence of the reverse current flow, and wherein the first switch is operated to the opened state after the second switch switches to the closed state.

9. The proximity detection circuit of claim 8 wherein the second switch is configured to be in the opened state when a forward current flow occurs through the resistor.

10. The proximity detection circuit of claim 9 wherein the forward current flow occurs through a pin of the charging cordset when the charging cordset is connected to the receptacle.

11. The proximity detection circuit of claim 1 further comprising a latching circuit operable to process the first signal into a second signal having a second duration, the second signal being provided to awaken the microcontroller, the second duration being longer than the first duration.

12. The proximity detection circuit of claim 11 wherein the first duration is shorter than a wake-up duration required to awaken the microcontroller, wherein the second duration is at least equal to the wake-up duration.

13. A proximity detection circuit for a vehicle charging system comprising:
- a low-voltage power supply;
- a connection circuit configured to generate a signal upon connection of a charging cordset to the vehicle charging system, the connection circuit being powered by the low-voltage power supply; and
- a protection circuit configured to disconnect the connection circuit from the low-voltage power supply upon occurrence of a reverse current flow to the low-voltage power supply.

14. The proximity detection circuit of claim 13 wherein the connection circuit and the protection circuit in total consume less than 200 μA from the low-voltage power supply when a cordset is disconnected from the vehicle charging system.

15. The proximity detection circuit of claim 13 wherein the connection circuit is directly connected to the low-voltage power supply such that a voltage input to the connection circuit from the low-voltage power supply approximately equals a voltage output of the low-voltage power supply.

16. The proximity detection circuit of claim 15 wherein the connection circuit includes a first switch and a resistor, the first switch being connected between the resistor and the low-voltage power supply, the resistor being connected between the low-voltage power supply and a vehicle ground, the reverse current flow occurring through the resistor and the first switch.

17. The proximity detection circuit of claim 16 wherein the protection circuit includes a second switch connected to the first switch, the second switch being configured to an opened position when a forward current flows through the resistor and the first switch, the second switch being configured to a closed position when the reverse current flows through the resistor and the first switch, the second switch being configured to open the first switch when the second switch is in the closed position.

* * * * *